US006931388B2

(12) United States Patent
Robbins (10) Patent No.: US 6,931,388 B2
(45) Date of Patent: Aug. 16, 2005

(54) ACCEPTING QUERY THAT INCLUDES AT LEAST A PORTION OF ADDRESS WITHOUT SHIPPING IDENTIFIER FOR TRACKING, DELIVERY OF SHIPMENT IN COMPUTER NETWORK

(75) Inventor: Ronald Robbins, Lafayette, IN (US)

(73) Assignee: M.A.I.L., Inc., Lafayette, IN (US)

( * ) Notice: Subject to any disclaimer, the term of this patent is extended or adjusted under 35 U.S.C. 154(b) by 121 days.

(21) Appl. No.: 10/414,183

(22) Filed: Apr. 15, 2003

(65) Prior Publication Data

US 2003/0182265 A1 Sep. 25, 2003

Related U.S. Application Data

(63) Continuation of application No. 09/501,505, filed on Feb. 9, 2000, now abandoned.

(51) Int. Cl.[7] .............................................. G06F 17/30
(52) U.S. Cl. ........................... 707/1; 707/9; 707/104.1; 709/201; 713/201
(58) Field of Search .................... 707/1–10, 100–104.1, 707/200–205; 709/201–215; 713/200–202; 705/1–35, 60–65; 342/357.07; 702/128; 235/375–382, 385; 209/584; 700/213–230

(56) References Cited

U.S. PATENT DOCUMENTS

| 5,043,908 A | * | 8/1991 | Manduley et al. .......... 700/227 |
| 5,072,397 A | * | 12/1991 | Barns-Slavin et al. ...... 705/402 |
| 5,631,827 A | * | 5/1997 | Nicholls et al. .............. 705/28 |

(Continued)

FOREIGN PATENT DOCUMENTS

| EP | 0855687 | * | 7/1998 |
| WO | WO 02/39218 A2 | * | 5/2002 |
| WO | WO 02/059817 | | *8/2002 |

OTHER PUBLICATIONS

Bay area computer products, Inc.electronics wholesale distribution, "Shipping Tracking" 2001 one page.*

Incense Galore, "shipment Tracking", updated Aug. 2004, 2 pages.*

Atock,C, Where's my stuff? [supply chain management], manufacturing engineering, Apr. 2003, vol 82, issue: 2, pp 24–27.*

Steven Y Goldsmith et al. a multi–agent system for coordinating international shipping, Lecture notes in computer science, 1998, 15 pages.*

Michael J Carey et al. "processing top N and bottom N queries",1997 IEEE computer socety technical comittee on data engineering, 1997 pp 1–8.*

CMS consultants, Delivering excellence, "WroldLink Enterprise shipping solution benefits and features", showcases feature functionality in WorldLink version 3.6, Jun. 24, 2004, 28 pages.*

Primary Examiner—Srirama Channavajjala
(74) Attorney, Agent, or Firm—Woodard, Emhardt, Moriarty, McNett & Henry LLP (57) ABSTRACT

A novel tracking system is disclosed. In one embodiment, users obtain access to tracking information by entering a destination address in a query. In another embodiment, package shippers are given a "shipper password" and a "recipient password." In this embodiment, the shipper may query the system with the shipper password to track all packages it has sent, and the recipient may query the system with the recipient password (and, optionally, one or more portions of the recipient's address information) to track all packages that the shipper has sent to that address. Different amounts of detail may be shown to shippers and recipients. In another embodiment, a service bureau may accept packages from shippers, collect information about the packages, process queries by shippers and recipients, and track packages that it handles using a separate "service bureau password."

29 Claims, 8 Drawing Sheets

U.S. PATENT DOCUMENTS

| | | | | |
|---|---|---|---|---|
| 5,965,110 A | * | 10/1999 | Arnold | 424/44 |
| 6,047,264 A | * | 4/2000 | Fisher et al. | 705/26 |
| 6,134,561 A | * | 10/2000 | Brandien et al. | 707/104.1 |
| 6,175,825 B1 | * | 1/2001 | Fruechtel | 705/404 |
| 6,220,509 B1 | * | 4/2001 | Byford | 235/375 |
| 6,285,916 B1 | * | 9/2001 | Kadaba et al. | 700/222 |
| 6,321,992 B1 | * | 11/2001 | Knowles et al. | 235/462.01 |
| 6,338,055 B1 | * | 1/2002 | Hagmann et al. | 707/2 |
| 6,433,732 B1 | * | 8/2002 | Dutta et al. | 342/357.07 |
| 6,510,992 B2 | * | 1/2003 | Wells et al. | 235/385 |
| 6,539,360 B1 | * | 3/2003 | Kadaba | 705/28 |
| 6,571,213 B1 | * | 5/2003 | Altendahl et al. | 705/1 |
| 2002/0013739 A1 | * | 1/2002 | O'Donnell et al. | 705/26 |
| 2002/0095347 A1 | * | 7/2002 | Cummiskey | 705/26 |
| 2003/0132854 A1 | * | 7/2003 | Swan et al. | 340/825.49 |
| 2003/0132855 A1 | * | 7/2003 | Swan | 340/825.49 |
| 2003/0144852 A1 | * | 7/2003 | Eckert et al. | 705/1 |

* cited by examiner

| PACKAGE I.D. | SHIPPER I.D. | RECIP. NAME | DEST. ST. | DEST. ZIP |
|---|---|---|---|---|
| 1648-3481-6687 | 12-672 | ACME CO. | 1128 BADGET CIR. | 16978 |
| 4678-3222-6521 | 12-644 | ADAMS CORP. | 455 SMITH RD. | 36458 |
| 1181-4567-2310 | 11-456 | WOOD INC. | 6651 JAMES DR. | 88721 |

| SHIPPER I.D. | PASSWORD | PWD. TYPE | USER NAME | USER ADDR. |
|---|---|---|---|---|
| 12-672 | BOWZER | SHIPPER | SMITH INS. | 1265 N. ALABAMA |
| 12-672 | WHODAT | RECIPIENT | WORDS CO. | 615 W. WASHINGT |
| 12-644 | 7UNT8IH | SHIPPER | FIRST BANK | P.O BOX 23 |
| 12-644 | 62PRN5L | RECIPIENT | WILSON INC. | 461 S. STATE |
| 11-456 | WIDGET | SHIPPER | BOB DOE | 7881 BANKS ST. |
| 11-456 | BLAS67 | RECIPIENT | JAMES CO. | 231 FLOWER |

| TRACKING # | EVENT TYPE | EVENT DATE | EVENT TIME | SCANNED IN ZIP |
|---|---|---|---|---|
| 1648-3481-6687 | ACCEPTED | 22-JUN-2000 | 21:39:40 | 47901 |
| 4678-3222-6521 | IN-TRANSIT | 22-JUN-2000 | 21:39:47 | 46240 |
| 1181-4567-2310 | DELIVERED | 22-JUN-2000 | 21:39:51 | 47912 |
| 4678-3222-6521 | IN-TRANSIT | 22-JUN-2000 | 21:40:12 | 47905 |
| 1181-4567-2310 | ACCEPTED | 22-JUN-2000 | 21:41:25 | 46235 |

ACCEPTING QUERY THAT INCLUDES AT LEAST A PORTION OF ADDRESS WITHOUT SHIPPING IDENTIFIER FOR TRACKING, DELIVERY OF SHIPMENT IN COMPUTER NETWORK

REFERENCE TO RELATED APPLICATION

This application is a continuation of U.S. application Ser. No. 09/501,505, is now abandoned filed Feb. 9, 2000.

BACKGROUND OF THE INVENTION

The present invention is directed to shipment tracking, and more particularly, but not exclusively, a query system for tracking the status of deliveries.

Present methods of tracking shipments and confirming delivery thereof suffer from ease of use problems and a lack of tools for easy administration and measurement of delivery performance. An available procedure for inquiring as to the status of a particular package requires entry of a package identifier, which in some cases may be as many as twenty alphanumeric characters. Shippers and recipients typically have identical access to tracking information.

Such an access system makes it difficult for organizations' mailroom personnel to manage and monitor the delivery status of their shipments, tens or hundreds of which may be en route at any given time.

Furthermore, such an access system makes it difficult for the intended recipients to monitor progress of their shipments. The package identifier for a given package is typically communicated by the sender to the recipient, who then uses that package identifier to query the delivery system for the status of that particular package. The sender may even employ customer service staff to perform tracking queries on behalf of recipients. For shippers and receivers engaged in an ongoing relationship, communicating a unique package identifier or performing queries for each package sent can impose a significant burden.

There is thus a need for further contributions to tracking system technology.

SUMMARY

One form of the present invention is a unique tracking system. In some embodiments, the system overcomes the inconvenience of tracking numbers by allowing electronic searches of tracking data by the name or address of the recipient. Other embodiments limit the search results available to a user based on the password used, which limiting might restrict results to those packages sent by a particular shipper, those packages addressed to a particular recipient, or those packages handled by a particular service provider.

DETAILED DESCRIPTION OF THE PREFERRED EMBODIMENTS

For the purposes of promoting an understanding of the principles invention, reference will now be made to the embodiment illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

The present invention relates to a system for providing tracking data regarding packages that are being or have been transported by a carrier from a shipper to a receiver. As used in this application, the terms "package," "parcel," "shipment," and "item" refer to any object or set of objects sent from one entity to another via a courier or delivery service, regardless of what encloses the item (e.g., an envelope or box) or what entity transports it (e.g., postal service, Federal Express, United Parcel Service, etc.).

In the illustrated embodiment, reference will be made to a common carrier and a separate service bureau. It will be apparent to those skilled in the art that, in other embodiments within the scope of the present invention, these entities' functions as described herein could be performed by other separate organizations or by a single organization, such as a private carrier.

Figure 1:
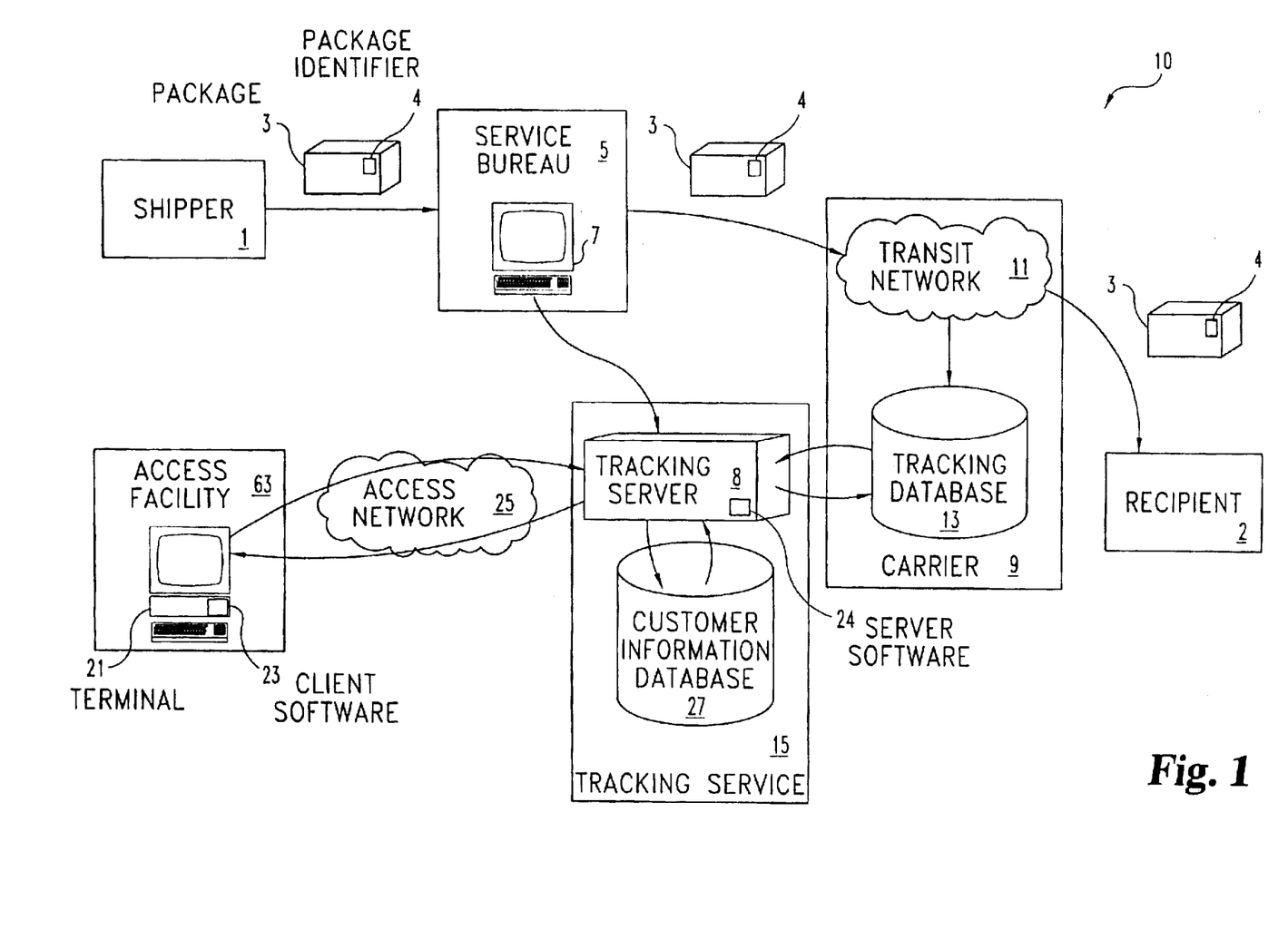
FIG. 1 is a block diagram of a tracking system according to one embodiment of the present invention.

Generally, in the exemplary embodiment shown in FIG. 1 as system 10, service bureau 5 serves local shippers 1 by accepting packages 3 and forwarding them to their intended recipients 2 via carrier 9. Tracking service 15 collects information about the package and its movement (as discussed below) from service bureau 5 and carrier 9. Tracking service 15 then provides shippers 1, recipients 2, and service bureau 5 with controlled access to that data through a query/response interface made available by tracking server 8.

To control this access, service bureau 5 supplies to each of its shipping customers a "shipper password" and a "recipient password." (Alternatively, the shipping customer may select its passwords.) Shipper 1 may use the "shipper password" to retrieve certain information regarding packages it ships via service bureau 5 and carrier 9. Shipper 1 may give the recipient password to the various entities to which it sends packages, so that they can retrieve certain information regarding those packages. The access method and the scope of information available using a shipper password may be different from the access method and information available using a recipient password, as discussed herein. Although the description herein is given in terms of a system using one shipper password and one recipient password per shipper, multiple shipper passwords and/or recipient passwords may be given to a single shipper within the scope of the present invention. Such an arrangement would allow the system to provide greater security and a customized interface for each recipient's tracking information.

Service bureau 5 may also have a separate password for access to data regarding all parcels it handles in system 10. This password might be used to gain a still different mode of access to a still different collection of data regarding parcels it ships on behalf of various shippers 1.

The present invention may also be carried out in the context of a different business model. As described herein, tracking service 15 manages supplemental tracking data regarding certain packages 3 being delivered by carrier 9. Personnel from service bureau 5 may pick up or accept packages from various shippers 1, enter the data for use by tracking service 15, and arrange for the package 3 to enter the transit network 11 of carrier 9. Alternatively, the functions of service bureau 5 and tracking service 15 may be consolidated with the functions of carrier 9. In some circumstances, additional efficiencies may be realized by such combination.

In some embodiments of the present invention, when a single shipper password and/or recipient password are used to access all packages sent by a particular shipper, the difficulty of remembering or managing long strings of alphanumeric characters can be avoided. The single reusable password can allow access to an index of those packages, which index can be used to retrieve package identifiers (see discussion related to FIG. 4), and the package identifiers can be used to access the corresponding tracking data (see discussion relating to FIG. 7). This lookup process may be performed manually or automatically, greatly reducing the administrative burden of managing tracking information for volume shippers.

Referring again to FIG. 1, an overview of an exemplary embodiment of the present invention will now be given. Shipper 1 delivers package 3 to service bureau 5. Using workstation 7, service bureau 5 acquires data relating to package 3, including, for example, it's a shipping or package identifier 4 (tracking number), sender name and account number, recipient name and address, parcel weight and postage due, and any other accounting information desired. A manifest may also be created at workstation 7, depending on the number and type of parcels sent together and the method of carriage. Workstation 7 sends some or all of this information to tracking server 8 where a new record or data set, preferably including a time stamp, is created from that information and inserted into table 401 (discussed in relation to FIG. 4, below) for use in responding to queries as described below. Packages 3 may then be given by the service bureau 5 to the carrier 9 for routing through transit network 11.

Workstation 7 may comprise one or more CPUs, keyboards, monitors, printers, barcode scanners, scales, communication and/or networking devices, and software packages as necessary or desired to perform the intended functions.

When package 3 is accepted for transport by carrier 9, a message containing the package identifier 4 and a time stamp for the acceptance event is preferably sent to and stored as a tracking data set in table 701 (discussed in relation to FIG. 7, below) in tracking database 13. When package 3 reaches selected points en route (for example, at each distribution facility, or when it is loaded and/or unloaded from a vehicle), additional messages are preferably sent to and stored as another tracking data set in table 701 of tracking database 13 with the package identifier 4 and the date, time, location, and nature of each tracking event. When package 3 is delivered to recipient 2, another message is preferably sent to tracking database 13 with the package identifier and delivery date, time, and location, and is stored as still another tracking data set in table 701. This message may also contain information about the person who accepted delivery (e.g., name, title, and signature image), which may also be stored in table 701 or elsewhere in tracking database 13.

At any time after a data set regarding package 3 is recorded by tracking server 8, a query may be made at access facility 63 using terminal 21 with client software 23. Access facility 63 may be an office of shipper 1 or recipient 2, or a public access terminal (such as a public library computer with Internet access), a booth for customer access at service bureau 5, in the form of a kiosk provided by the service bureau 5 at one or more locations, or other facility as may occur to one skilled in the art. Client software 23 may be custom software on a dedicated computer, a standard HTML browser on a general purpose computer, or any other human or machine interface that may occur to one skilled in the art.

Client software 23 sends the query to tracking server 8 via access network 25, which may be the Internet, an intranet, a dedicated telecommunications line, or any other suitable communications channel. The query contains a password. Tracking server 8 communicates with client software 23 and customer information database 27 to determine a parcel list for which tracking information is required. (See discussion related to FIGS. 2 and 3a–3c, below.)

Tracking server 8 queries carrier tracking database 13 to obtain tracking data for items on the item list. Tracking database 13 replies to tracking server 8 with a collection of tracking event data related to those items. Tracking server 8 filters and formats the tracking event data, then sends the formatted data via access network 25 to terminal 21 for display with client software 23. This display may be in the form of an HTML World Wide Web page, an XML document, a custom report screen, a printed report, or other appropriate form. The tracking event data may also be captured and stored at access facility 63 for record-keeping or later processing.

Although the present description is given with tracking server 8 and customer information database 27 within the control of tracking service 15, tracking database 13 within the control of carrier 9, and workstation 7 physically located at service bureau 5, these resources may be placed in different configurations. For example, customer information database 27 could be located with tracking database 13 in the control of carrier 9. Databases 13 and 27 might use distributed and/or redundant storage. Tracking server 8 and/or customer information database 27 might be kept within the control of service bureau 5. Those skilled in the art may appreciate that additional configurations could be used within the scope of the present invention.

Figure 2:
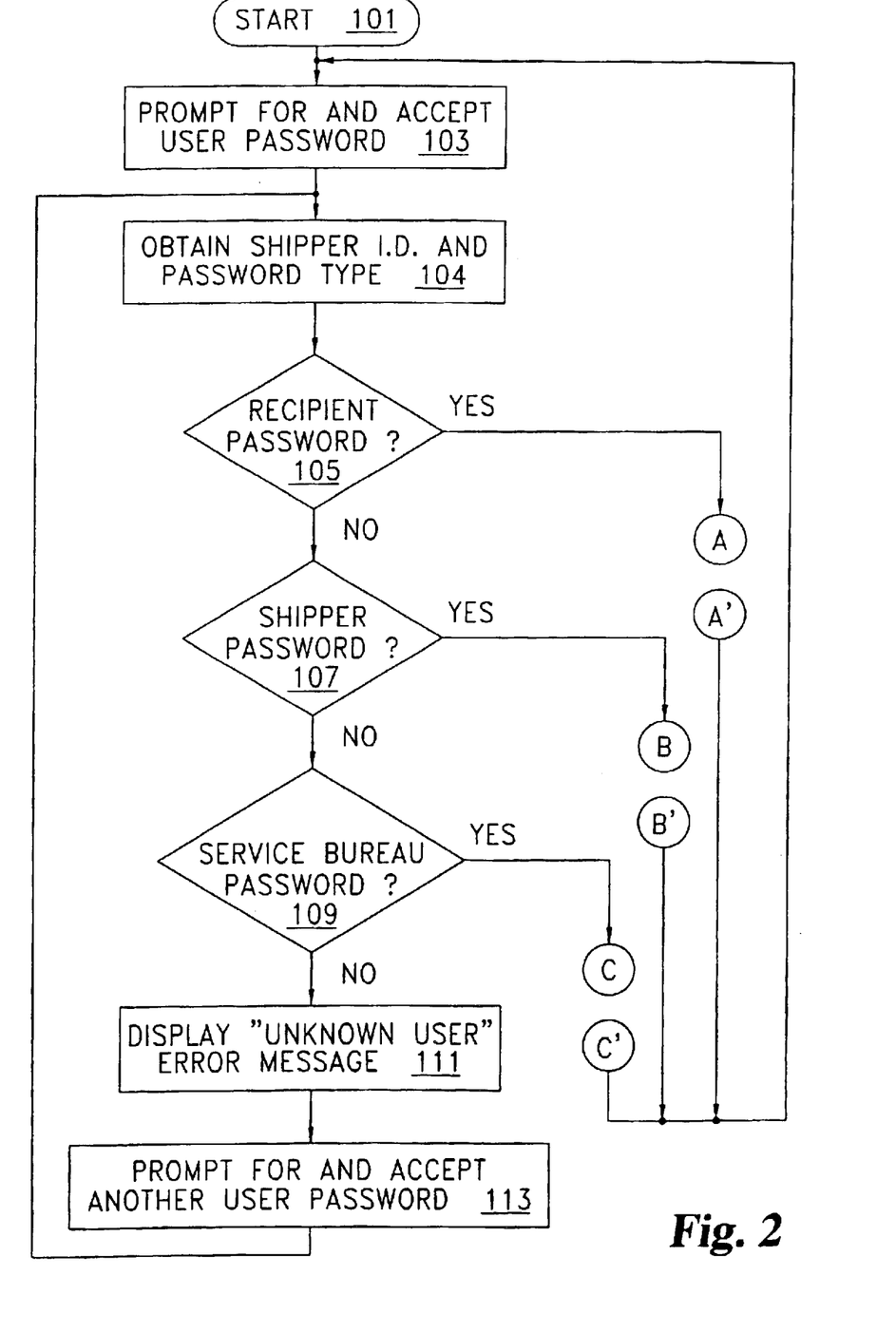
FIG. 2 is a flow chart of a query session using a system according to one embodiment of the present invention.

Referring additionally to FIG. 2, an access session 100 for one embodiment of the present invention will now be described. This aspect of the present invention may be implemented in a unified World Wide Web site, or with separate sites for shippers, receivers, and service bureaus, or with any other organization that may occur to one skilled in the art.

Access session 100 starts at start block 101. An initial Web page prompts for and accepts a user password (which may be the shipper's password, the shipper's account number, or any other suitable identifier) at block 103. When the user enters a password, tracking server 8 at block 104 queries customer information database 27 with the user password, and customer information database 27 returns the password type and the Shipper ID (which may be the shipper's password, the shipper's account number, or any other suitable identifier) for the appropriate shipper. Using the data in this response, tracking server 8 determines whether the user password is a recipient password at decision block 105. If so, it proceeds to point A, discussed below in relation to FIG. 3A.

If not, tracking server 8 determines at decision block 107 whether the user password entered at block 103 is a shipper password. If it is a shipper password, execution proceeds at point B, discussed below in relation to FIG. 3B. If it is not a shipper password, tracking server 8 determines at decision block 109 whether the user password is a password for a service bureau.

If the user password is a password for a service bureau, execution proceeds at point C, discussed below in relation to FIG. 3C. If the user password is not any of the password types tested in decision blocks 105, 107, and 109, an error message is displayed at block 111, and system 10 prompts for and accepts another password at block 113. System 10 processes this password as it processed the user password entered at block 103. After returning from the procedures specific to recipients (at point A'), shippers (at point B'), and service bureaus (at point C') (discussed below in relation to FIGS. 3A, 3B, and 3C, respectively), execution resumes with a prompt for another user password at block 103.

Figure 3A:
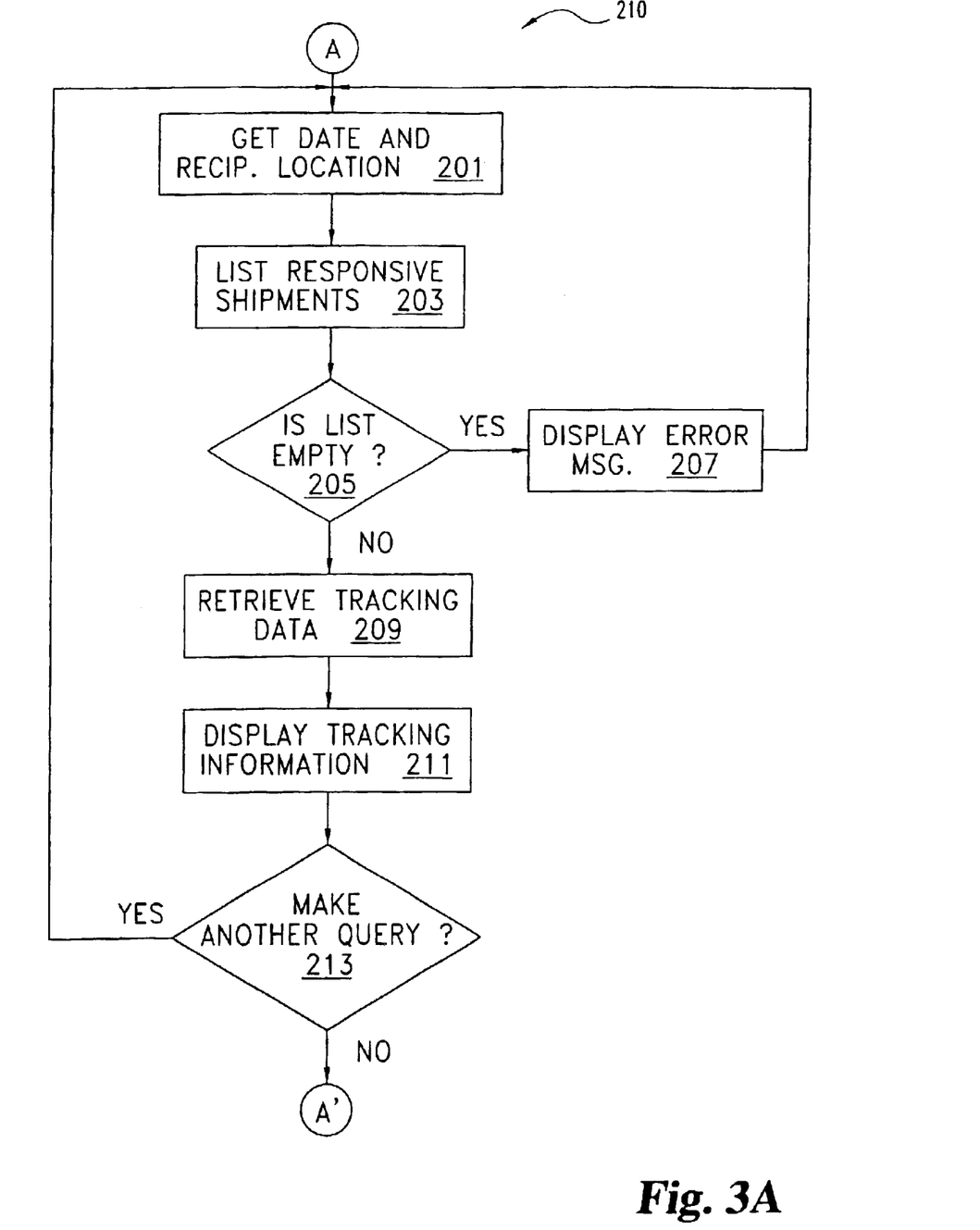
FIG. 3A is a flow chart of a query session using a recipient password according to one embodiment of the present invention.

Procedure 210, designed to handle queries by a package recipient, will now be described with reference to FIGS. 1 and 3A. At block 201, system 10 prompts for and accepts a ZIP code, street number, and optional date range for the recipient's query. Tracking server 8 filters its list of shipment data sets in customer information database 27 based on the Shipper ID (received at block 104) and the information entered at block 201 to yield a list of candidate shipments. At decision block 205, tracking server 8 determines whether that list is empty. If so, an error message is displayed at block 207, and system 10 returns to block 201 to prompt for a new query from the recipient.

If tracking server 8 determines at decision block 205 that the list is not empty, tracking server 8 proceeds to block 209 and retrieves tracking data for shipments on the list from carrier tracking database 13. This data is formatted and displayed at block 211. This data may include the sender's name and account number; recipient's name and address package identifier; date and time of acceptance of the package by service bureau 5; date, time, and location of acceptance of the package by carrier 9; the current (or most recently noted) transit and/or delivery status of the package date, time, location, and nature of tracking events that have occurred during transit of the package through transit network 11; date, time, and location of delivery of the parcel; and/or any other information desired as would occur to one skilled in the art. This data may be displayed in a table, in graphic form, as plain text, or in any other form as appropriate, or using a combination of such forms. The user may have the opportunity to print or capture the data, select alternative formats, or view an image of the signature received upon delivery of the package, if such an image was captured and he or she so desires.

At decision block 213, the user is given the option to make another query. If the user indicates such a desire, the process returns to the prompt at block 201. Otherwise, execution returns to the process in FIG. 2 at re-entry point A'.

Figure 3B:
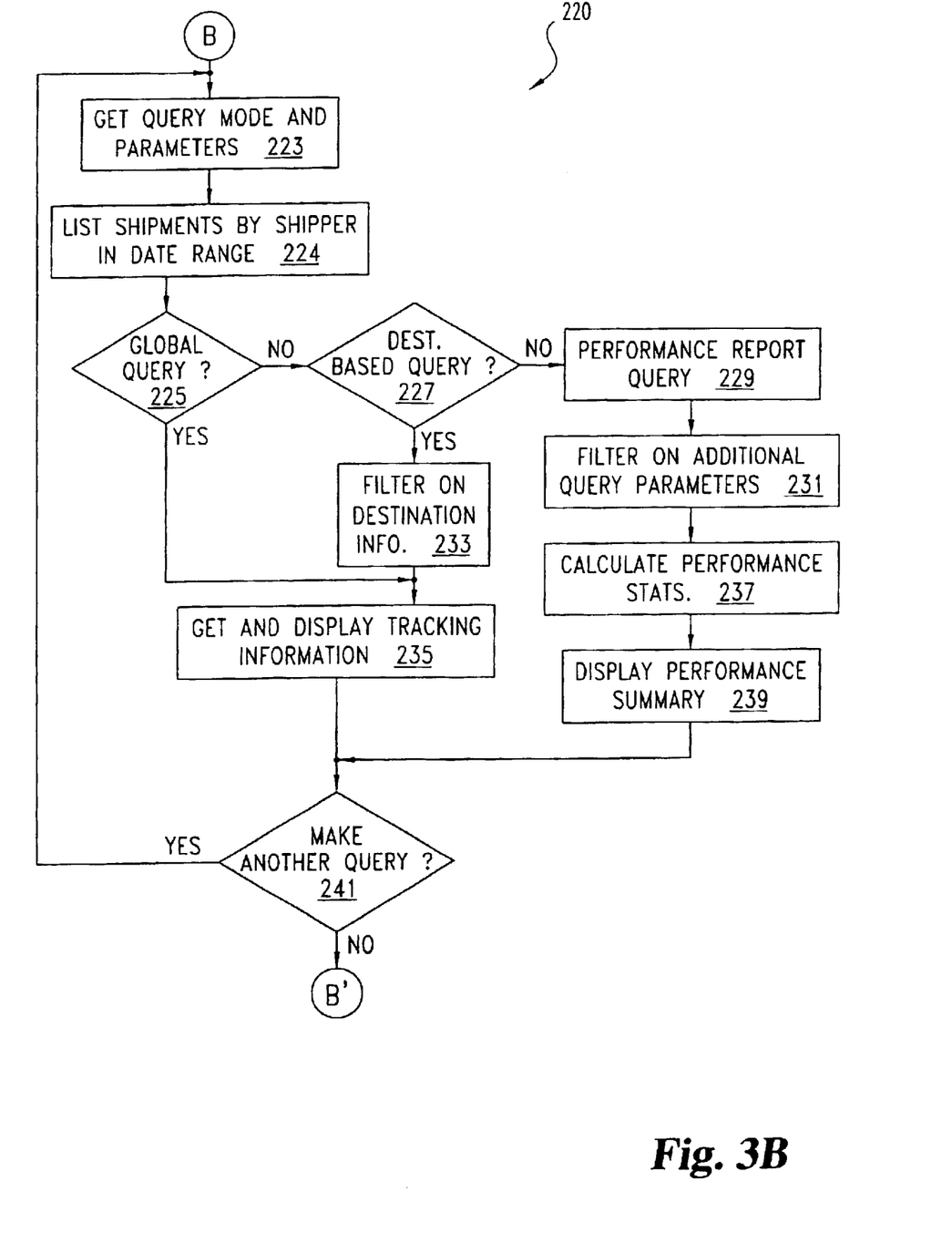
FIG. 3B is a flow chart of a query session using a shipper password according to one embodiment of the present invention.

Process 220, relating to a query by a shipper, is shown in FIG. 3B. System 10 prompts for the shipper's query mode (see options below) and parameters, and accepts input of that information at block 223. Then at block 224, tracking server 8 queries customer information database 27 to create a list of packages sent by the shipper (identified at block 104) in the date range (if any) provided by the user at block 223.

Tracking server 8 checks at decision block 225 whether a global query was made. If so, execution continues at block 235. If the query was not global, tracking server 8 checks for a destination-based query at decision block 227. If the query was also not destination-based, tracking server 8 concludes at block 229 that a delivery performance report was requested.

If at decision block 227 tracking server 8 determined that a destination-based query was made, then the shipment data set collection obtained at block 233 is filtered further based on the destination information given by the user. This filter can preferably function with full or only partial destination information; for example, with only the first three digits of a destination ZIP code.

Whether based on a global query (from decision block 225) or a destination-based query (block 233), information relating to packages on the filtered list is obtained from tracking database 13 and displayed for the user at block 235. This information may include any or all of the items listed above in relation to the display at block 211, but may comprise a different collection of those items depending on the needs or preferences of the parties involved. The user may again have the opportunity to print or capture the data, select different display formats, or to view an image of the signature received upon delivery of the package, if such an image was captured and he or she so desires.

When tracking server 8 determines at block 229 that a delivery performance report has been requested, the collection of items (created at block 224) upon which to report is filtered at block 231 based on the additional query parameters, if any, given by the user at block 223. Tracking server 8 then calculates (at block 237) the relevant delivery performance statistics for items remaining in the collection, then displays a delivery performance summary of those statistics in suitable form at block 239. Again, the user may have the option of capturing and/or printing this summary, or accessing the underlying data. Data meeting certain criteria may be displayed differently from other data; as a non-limiting example, by highlighting data for items that were delivered outside a certain time window after acceptance by carrier 9.

After the display of data at block 235 or block 239, execution continues at decision block 241, where the user is given the option to submit another query. If the user exercises that option, execution proceeds with another prompt and acceptance of query mode and parameters at block 223. If not, execution proceeds at point B' in FIG. 2, as discussed above.

Figure 3C:
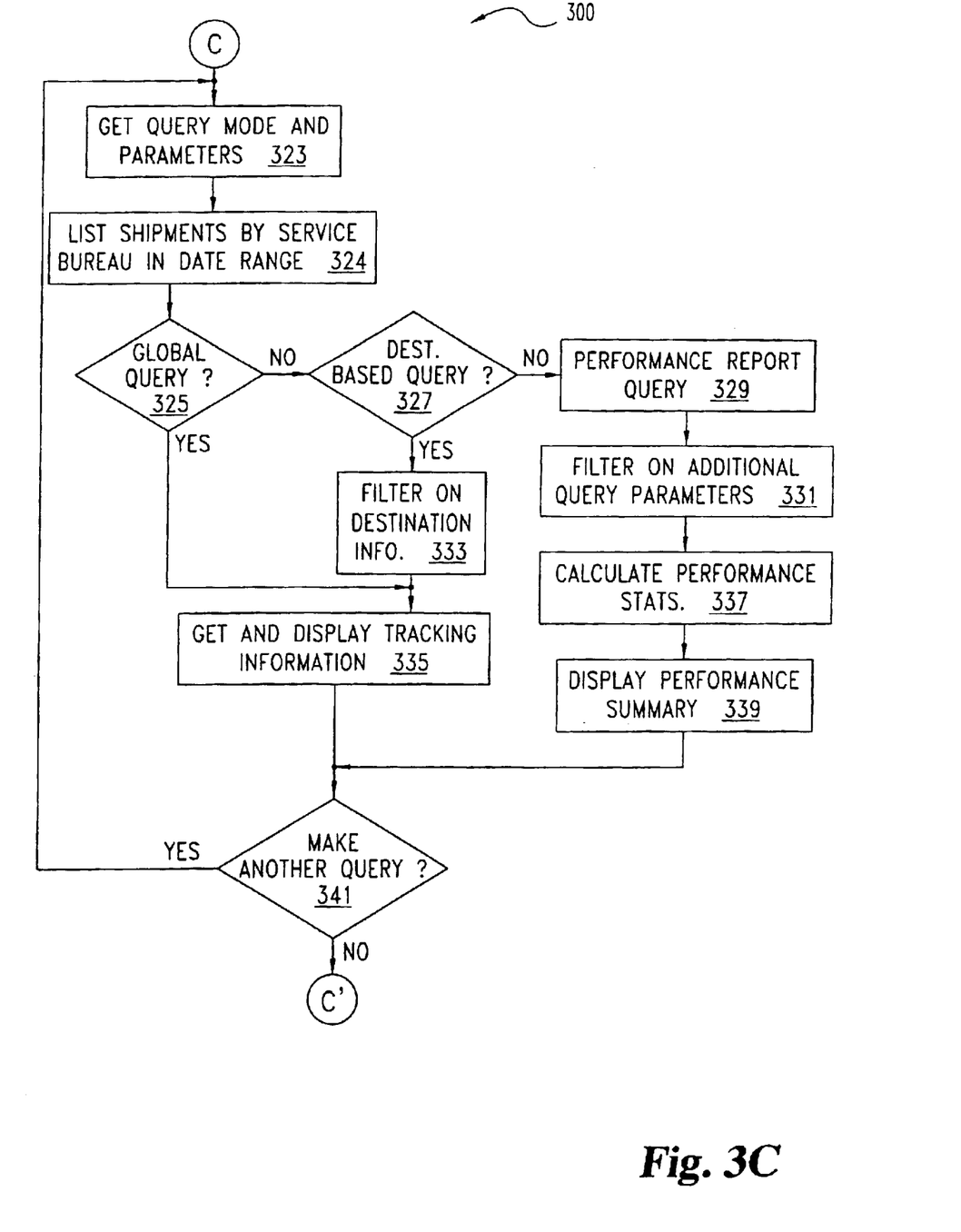
FIG. 3C is a flow chart of a query session using a service bureau password according to one embodiment of the present invention.

If system 10 determines at decision block 109 that the user has entered a service bureau's password, process 300 shown in FIG. 3C is followed. System 10 prompts the user for and accepts input of the query mode and parameters at block 323. Then at block 324 tracking server 8 queries customer information database 27 to create a list of packages sent via the service bureau (which was identified at block 104) in the date range (if any) provided by the user at block 323. Tracking server 8 classifies the query at decision blocks 325, 327, and 329, corresponding to decision blocks 225, 227, and 229 in FIG. 3B. At block 333, tracking server 8 filters the collection of items based on destination-based query parameters given at block 323. Tracking information relating to entries on the resulting list (in the case of a global query, the output of the query at block 324) is obtained from tracking database 13 and displayed at block 335 in any suitable fashion (see block 235 above). This information may include one or more of the details of the information described in connection with FIGS. 3A and 3B. For a delivery performance report query, the list is filtered at block 331 (like block 231 above) and statistics are calculated at block 337 (like block 237 above) and displayed at block 339 (like the display at block 239 above).

At decision block 341, the user is given the option to request another query. If the user elects to do so, system 10 prompts for the mode and parameters for the next query at block 323. If not, system 10 continues at point C' in FIG. 2.

The methods of FIGS. 2, 3A, 3B, and 3C are preferably embodied in software on computer-readable media, the software being executed by terminal 21 and tracking server 8 as client software 23 and server software 24, respectively.

Figure 4:
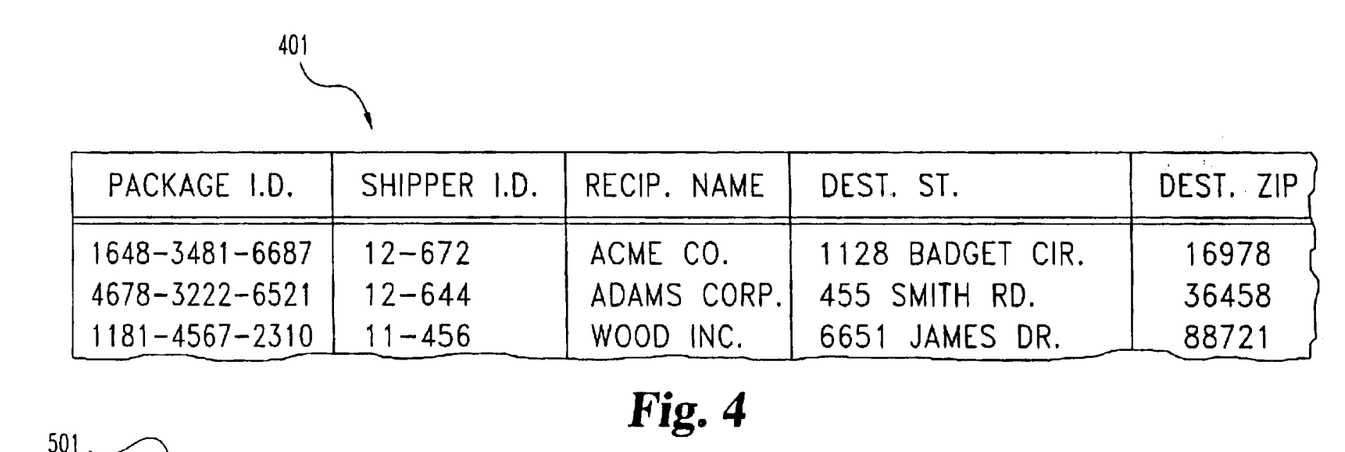
FIG. 4 is a table of sample shipment data sets according to one embodiment of the present invention.

Turning now to FIG. 4, a table 401 of shipment records for one embodiment of the present invention is shown. In this example, each line (record) in the table corresponds to a package being tracked by system 10, and the table is stored in customer information database 27 (see FIG. 1). The record in table 401 for a given package 3 is created when the initial data regarding that package is acquired at workstation 7 and transmitted to tracking server 8. Information in a record in table 401 identifies and characterizes the package; for example, its package identifier, service classification (e.g., Priority Mail, Express Mail, Overnight Courier), postage cost, shipper identifier, shipper name, shipper address, recipient name, destination street number, destination street, destination city, destination state, destination ZIP code, original acceptance date and time, service bureau identifier, etc. Table 401 may also store the destination street number or Post Office Box number in a separate field for easier access. After the package is delivered, tracking server 8 may store the delivery date and time in table 401, and may set a flag to indicate whether the package has been delivered within an expected time period. Any of this information may be used in the filtering processes at 106, 203, 221, 231, 233, 331, and 333, and may be retrieved and displayed at blocks 209, 211, 235, 239, 335, and 339 in FIGS. 2, 3A, 3B, and 3C, as discussed above.

Figure 5:
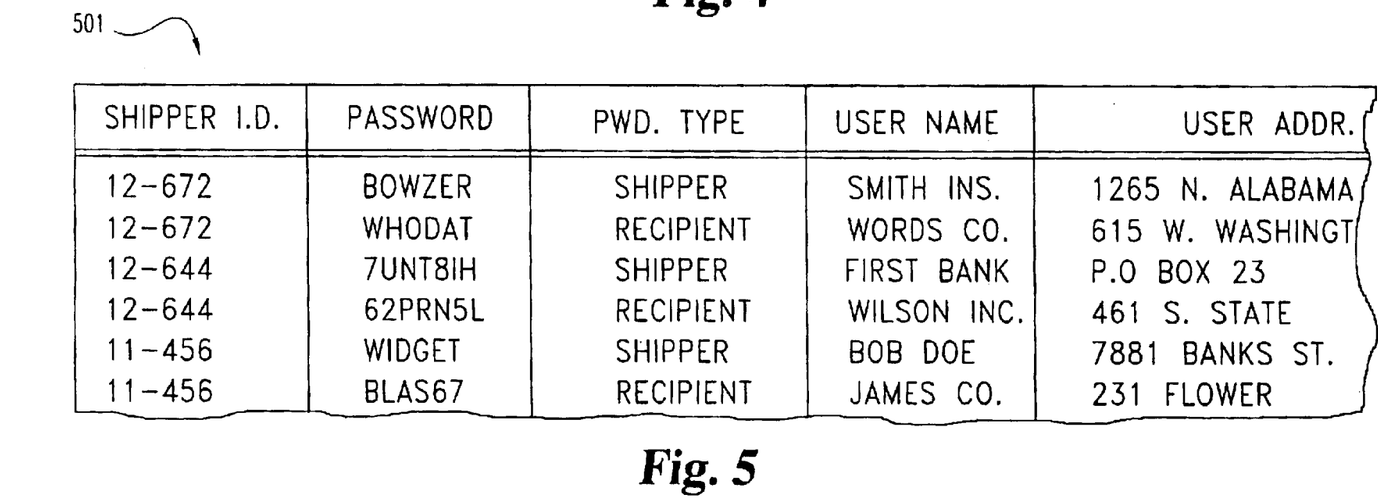
FIG. 5 is a table of sample password data sets according to one embodiment of the present invention.

An exemplary embodiment of table 501, which may also be maintained in customer information database 27, is given in FIG. 5. Table 501 stores relations between shipper identifiers given in the "shipper identifier" field of table 401 with corresponding "shipper passwords" and "recipient passwords." The rows (records) in table 501 are created when the passwords are initially distributed to or selected by the shipper (see above). The appropriate column(s) of this table 501 are searched when tracking server 8 attempts at decision block 107 to determine whether the user's password is a shipper password, and when it attempts at decision block 105 to determine whether the user's password is a recipient password.

Figure 6:
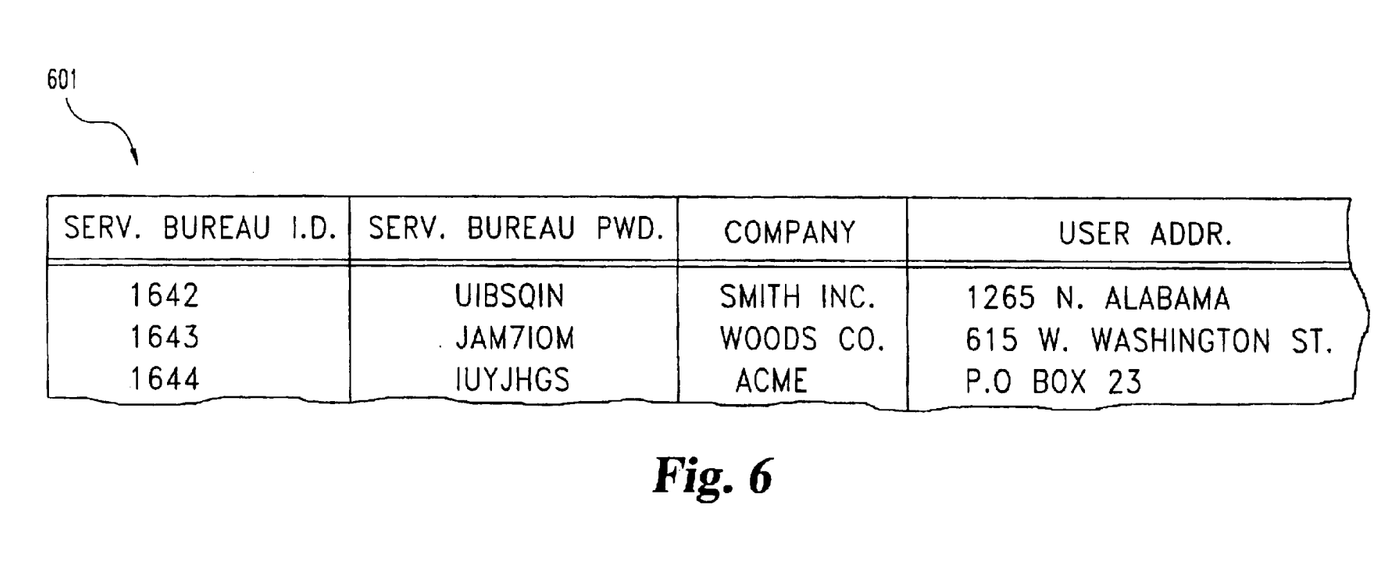
FIG. 6 is a table of sample pairs of Service Bureau IDs and Service Bureau Passwords according to one embodiment of the present invention.

An exemplary embodiment of table 601, which may also be maintained in customer information database 27, is shown in FIG. 6. Table 601 stores relations between service bureau identifiers and the corresponding service bureau passwords, company names, and other desired address and contact information. The rows (records) in table 601 are created when the password is initially given to the service bureau. This table is referenced by tracking server 8 at decision block 109 to determine whether the user password entered at block 103 belongs to a service bureau 5.

Figure 7:
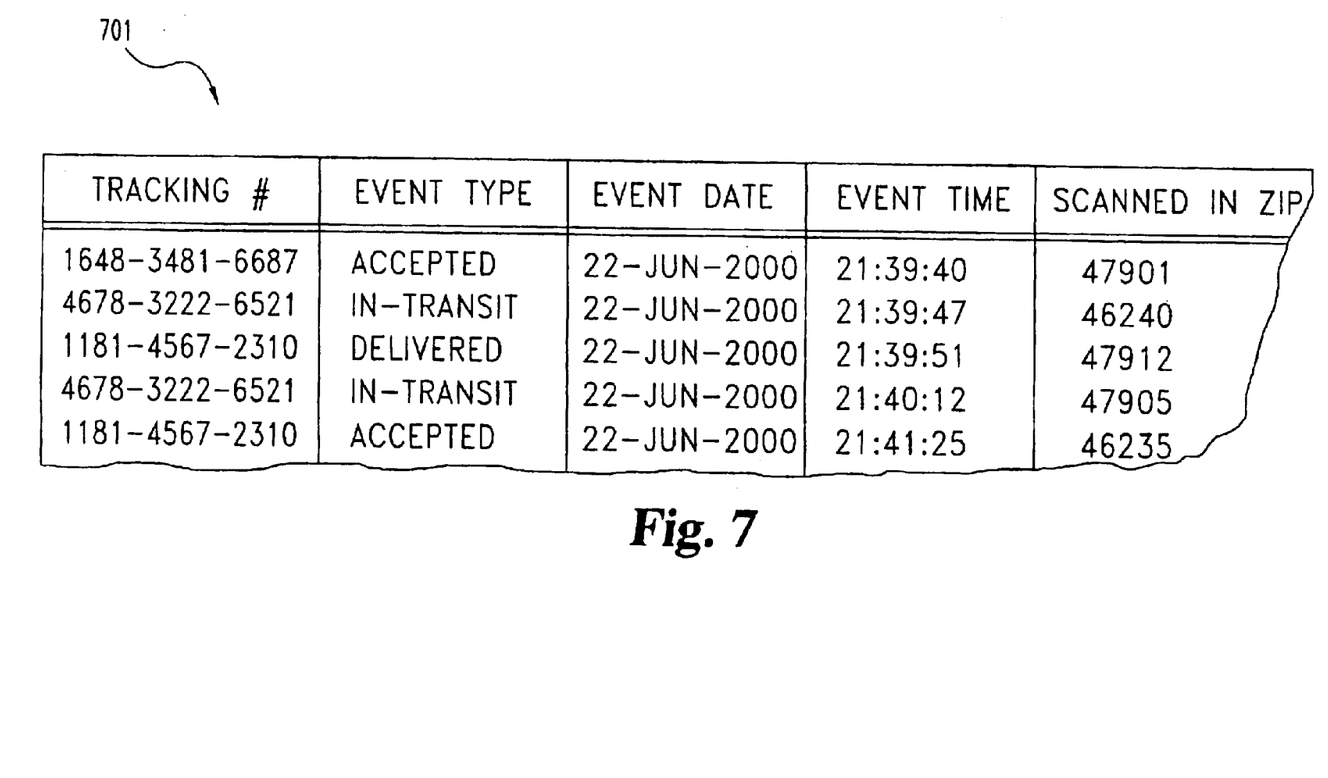
FIG. 7 is a table of sample tracking data sets according to one embodiment of the present invention.

Referring additionally to FIG. 7, carrier database 13 in the present exemplary embodiment contains table 701 of tracking events relating to packages that have been accepted for transport by carrier 9. For each tracking event, a row in table 701 is preferably created to store the tracking number of the package in question and the type, date, time, and location (including, for example, the ZIP code) of that event. Entries in table 701 are made to reflect various tracking events during transit and delivery of each package; for example, when each parcel is accepted for transit by carrier 9 and at various points in the transit and/or delivery of the parcel as described above in relation to FIG. 1. Table 701 is queried at blocks 209, 231, 235, 331, and 335 using the relevant package identifiers to retrieve tracking event data for display at blocks 211, 235, 239, 335, and 339.

Tables 401, 501, 601, and 701, exemplified in FIGS. 4, 5, 6, and 7, may comprise a single database at a single location, a single database distributed among multiple locations, multiple databases in multiple locations, or any other appropriate storage scheme. For example, tables 401 and 501 may be kept by service bureau 5, while table 601 is retained by tracking service 15 (see FIG. 1). Table 701 may be located at yet another facility, within the control of carrier 9, and be connected by dedicated line to tracking server 8 at tracking service 15. With this alternative structure, data related to shipments by each shipper 1 remains within the control of the service bureau 5 with which shipper 1 has a business relationship, and probably direct contractual privity.

As another example, tracking service 15 might maintain a local copy (not shown) of at least a portion of tracking database 13. In this example, carrier 9 may provide an update file (not shown) of tracking information to tracking service 15 at regular intervals. Tracking service 15 may then use the update file to update its local copy of tracking database 13. When tracking server 8 requires tracking information as described herein, tracking server 8 may query the local copy.

An alternative arrangement within the scope of the present invention has tables 401, 501, and 601 (of FIGS. 4, 5, and 6, respectively) all within the control of tracking service 15. In this scenario, many service bureaus 5 might be linked with a single tracking service 15, but a single "front end" access method could link to tracker server 8 to obtain all necessary data for responding to the query, regardless of which service bureau 5 initially processed the relevant packages.

Another alternative arrangement allows queries from access facility 63 (see FIG. 1) using only recipient location information (for example, ZIP code and street number), but no user password. System 10 might provide a response comprising a limited subset of the information types discussed in relation to reporting block 235 in FIG. 3A.

In still another embodiment, a tracking service that is interrogated based on all or part of a shipment address is provided by a shipper with or without a separate service bureau or password access requirement.

A further alternative arrangement allows queries from access facility 63 (see FIG. 1) using recipient location information with a shipper password, or with a recipient password, or with a service bureau password. System 10 would again provide a properly filtered response comprising a limited subset of the information types discussed in relation to reporting block 235 in FIG. 3A.

In yet another embodiment, one provides for delivery of a shipment to an address, the shipment corresponding to a shipping identifier different from the address; accepts a query that includes at least a portion of the address without the identifier; and responds to the query by providing information regarding the shipment.

In still another embodiment, a shipper password and a recipient password, both associated with a shipper, are provided. A first shipment to a first recipient having first location information is accepted for delivery. A second shipment to a second recipient having second location information is also accepted for delivery. In response to a first query including the shipper password, access is provided to tracking information related to the first shipment and the second shipment. In response to a second query including the recipient password and the first location information, access is provided to tracking information related to the first shipment. In response to a third query including the recipient password and the second location information, access is provided to tracking information related to the second shipment.

In a still further embodiment, a server has access to a database comprising a table of shipment data sets, each comprising one of a number of shipper identifiers, recipient location data, and tracking data related to a shipment. The server also has access to a table of shipper data sets, each comprising one of a number of unique shipper passwords, a recipient password, and a shipper identifier. The server is responsive to a first query including one of said shipper passwords to provide only shipment data sets corresponding to that one of the shipper passwords. The server is responsive to a second query including one of the recipient passwords and corresponding recipient location information to provide only shipment data sets corresponding to that one of the recipient passwords and the corresponding recipient location information.

In still a further embodiment, a network node is in communication with a tracking information server, and a transmission line is in communication with the network node and with an access facility. A query signal is carried by the transmission line and comprises an address signal. A response signal carried by the transmission line represents tracking data from the tracking information server, where the tracking data is related to a package being transported to an address corresponding to the address signal, and although the package has an identifier, the query signal does not contain the identifier.

In still a further embodiment, a computer readable medium is encoded with programming instructions for a query-response routine to provide tracking information for a parcel tracking system, the programming instructions being executable to generate an output corresponding to tracking information for a shipment in response to entry of a password and at least a portion of a destination address for the shipment.

Other network topologies, database table and storage structures, and query schemes may be used as appropriate for a particular implementation of the present invention and would occur to one skilled in the art.

Modifications of the present disclosure and claims, as would occur to one skilled in the art, may be made within the scope of the present invention. While the disclosure above has been made in relation to preferred embodiments, the scope of the invention is defined by the claims appended hereto.

What is claimed is:

1. A method of providing tracking information based on electronic queries between networked computers, comprising:

providing for delivery of a shipment to an address, the shipment corresponding to a shipping identifier different from the address;

accepting an electronic query that includes at least a portion of the address without the shipping identifier; and automatically responding to the query by providing tracking data regarding the shipment.

2. The method of claim 1, wherein the provided tracking data comprises the identifier.

3. The method of claim 1, wherein the provided tracking data comprises information about at least one tracking event involving the shipment.

4. The method of claim 3, wherein the information about the at least one tracking event comprises the date of the at least one event.

5. The method of claim 4, wherein the information about the at least one tracking event further comprises the time of the at least one event.

6. The method of claim 1, wherein the electronic query includes a postal code.

7. The method of claim 1, wherein the electronic query includes a street number or post office box number.

8. The method of claim 1, wherein:
the electronic query further includes a date; and
the provided tracking data is limited based on the date.

9. The method of claim 1, wherein:
the electronic query further includes a password; and
the provided tracking data is limited based on the password.

10. A method of tracking shipments via a network of computers, comprising:

providing a shipper password associated with a shipper;

providing a recipient password associated with the shipper;

accepting a first shipment from the shipper for delivery to a first recipient having first location information;

accepting a second shipment from the shipper for delivery to a second recipient having second location information;

responding to a first electronic query by providing electronic access to data describing tracking events concerning the first shipment and tracking events concerning the second shipment, where the first electronic query includes the shipper password;

responding to a second electronic query by providing electronic access to data describing tracking events concerning the first shipment, where the second query includes the recipient password and the first location information; and responding to a third electronic query by providing electronic access to data describing tracking events concerning the second shipment, where the third electronic query includes the recipient password and the second location information.

11. The method of claim 10, wherein
the responding to a first electronic query comprises providing data about a first set of tracking events;
the responding to a second electronic query comprises providing data about a second set of tracking events; and
the second set of tracking events is a proper subset of the first set of tracking events.

12. The method of claim 10, wherein the first location information in the second electronic query comprises a postal code or ZIP code.

13. The method of claim 10, wherein the first location information in the second electronic query comprises at least one of a street number and a post office box number.

14. The method of claim 10, further comprising:
providing to a service bureau a service bureau code; and
responding to a fourth electronic query by providing electronic access to data describing tracking events concerning shipments sent via the service bureau, where the fourth electronic query includes the service bureau code.

15. The method of claim 14, wherein the shipments sent via the service bureau include both:

shipments sent by the shipper, and shipments sent by someone other than the shipper.

16. The method of claim 10, further comprising:

responding to a fifth electronic query by denying electronic access to data describing tracking events, where the fifth electronic query includes the recipient password but fails to include a predetermined threshold amount of the recipient location information.

17. The method of claim 16, wherein the threshold amount of the recipient location information comprises a postal code or ZIP code.

18. The method of claim 16, wherein the threshold amount of the recipient location information comprises at least one of a street number or a post office box number.

19. A system for providing shipment status information via digital communication, comprising:

a server having access to a database comprising:

a table of shipment data sets, each shipment data set comprising one of a number of shipper identifiers, recipient location data, and tracking data related to a shipment; and a table of shipper data sets, each comprising one of a number of unique shipper passwords, a recipient password, and a shipper identifier;

the server being automatically responsive to:

a first electronic query that includes one of the shipper passwords to provide only shipment data sets corresponding to the one of the shipper passwords; and a second electronic query that includes one of the recipient passwords and corresponding recipient location information to provide only shipment data sets corresponding to both (1) the one of the recipient passwords and (2) the corresponding recipient location information.

20. The system of claim 19, further comprising:

an interfacing means for accepting input from a user, formulating the query from the input, and formatting the response for display.

21. A system for providing shipment status information via digital electronic communication over a network of computers, comprising:

a network node in communication with a tracking information server;

a transmission line in communication with the network node and with an access facility;

a digital query signal carried by the transmission line, the query signal comprising address data; and a digital response signal carried by the transmission line, the response signal representing data from the tracking information server about tracking events, wherein the tracking events are related to a package being transported to an address corresponding to the address data, the package has a tracking identifier, and the query signal does not contain the tracking identifier.

22. The system of claim 21, wherein:

the query signal further comprises date information; and the tracking data is limited by the date information.

23. An apparatus, comprising a computer readable medium encoded with programming instructions for a query-response routine that provides information about tracking events, the programming instructions being executable to generate, in response to a user providing a password and at least a portion of a destination address for a shipment, an output corresponding to information about tracking events for the shipment.

24. The apparatus of claim 23, the programming instructions being executable also to generate an electronic response to an electronic query, where the electronic query includes the second password but no package identifier and no recipient location information, and the electronic response includes no tracking information.

25. A method of managing tracking information for packages being shipped, comprising:

accepting a plurality of packages for delivery from a plurality of shippers;

providing a different password to each of the plurality of shippers; and providing access to tracking event and billing information for some of the plurality of packages, comprising accepting entry of a first particular password;

determining that the first particular password was provided to a first particular shipper in the plurality of shippers;

limiting the access to tracking events and billing information to that related to those of the plurality of packages accepted from the first particular shipper;

wherein the billing information comprises shipping charges for a selected plurality of packages.

26. The method of claim 25, wherein at least a first one of the tracking events is an acceptance event.

27. The method of claim 26, wherein at least a second one of the tracking events is a delivery event.

28. A method of providing limited access to information about package tracking events, comprising:

providing a first password to the shipper of a package;

providing a second password to the addressee of the package;

providing a first user interface usable to search tracking information regarding the package in response to the first password; and providing a second user interface usable to search tracking information regarding the package in response to the second password;

wherein the first user interface and the second user interface comprise different sets of user interface elements.

29. The method of claim 28, wherein:

the first user interface enables searching for package tracking information using a first set of query parameters;

the second user interface enables searching for package tracking information using a second set of query parameters; and the first set of query parameters and the second set of query parameters are different.

* * * * *